United States Patent
Diwakar et al.

(10) Patent No.: US 11,467,273 B2
(45) Date of Patent: *Oct. 11, 2022

(54) SENSORS FOR DETERMINING OBJECT LOCATION

(71) Applicant: GM Cruise Holdings LLC, San Francisco, CA (US)

(72) Inventors: Aman Ashwin Diwakar, San Jose, CA (US); Gabriel Warshauer-Baker, Palo Alto, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 250 days.

This patent is subject to a terminal disclaimer.

(21) Appl. No.: 16/731,571

(22) Filed: Dec. 31, 2019

(65) Prior Publication Data

US 2021/0199785 A1 Jul. 1, 2021

Related U.S. Application Data

(63) Continuation of application No. 16/731,227, filed on Dec. 31, 2019, now Pat. No. 11,269,069.

(51) Int. Cl.
| | |
|---|---|
| *G01S 11/16* | (2006.01) |
| *G05D 1/02* | (2020.01) |
| *G05D 1/00* | (2006.01) |
| *G08G 1/01* | (2006.01) |

(52) U.S. Cl.
CPC .......... *G01S 11/16* (2013.01); *G05D 1/0055* (2013.01); *G05D 1/0231* (2013.01); *G05D 1/0255* (2013.01); *G08G 1/0116* (2013.01)

(58) Field of Classification Search
CPC .......... G01S 11/00; G01S 11/16; G05D 1/00; G05D 1/0055; G05D 1/02; G05D 1/021; G05D 1/0231; G05D 1/0255; G08G 1/00; G08G 1/01; G08G 1/0104; G08G 1/0108; G08G 1/0116
See application file for complete search history.

(56) References Cited

U.S. PATENT DOCUMENTS

| | | | | |
|---|---|---|---|---|
| 5,973,998 A | * | 10/1999 | Showen | ............... G01S 5/0036 367/124 |
| 2004/0240322 A1 | | 12/2004 | Szajnowski | |
| 2010/0008515 A1 | | 1/2010 | Fulton et al. | |

(Continued)

OTHER PUBLICATIONS

USPTO Non-Final Office Action issued in U.S. Appl. No. 16/731,227 dated Aug. 16, 2021; 19 pages.

*Primary Examiner* — James M McPherson
*Assistant Examiner* — Kyle J Kingsland
(74) *Attorney, Agent, or Firm* — Akona IP PC

(57) ABSTRACT

A method includes recording a first timestamp of a detection of an event with a first array of an array of light sensors or an array of acoustic sensors. The array of light sensors and the array of acoustic sensors are mounted on a same chassis. The method further includes determining a direction of the event, based on the detection with the first array; recording a second timestamp of a detection of the event by a second array of the array of light sensors or the array of audio sensors; determining a distance of the event from the arrays of light and audio sensors, based on the first timestamp and the second timestamp; and controlling a vehicle, based on the event, the vehicle including the chassis.

20 Claims, 8 Drawing Sheets

(56) References Cited

U.S. PATENT DOCUMENTS

| | | |
|---|---|---|
| 2010/0220551 A1 | 9/2010 | Akiyama et al. |
| 2010/0225461 A1* | 9/2010 | Tuli ................... G01S 3/8036 340/436 |
| 2015/0061895 A1* | 3/2015 | Ricci ................... B60R 25/00 340/902 |
| 2019/0049989 A1 | 2/2019 | Akotkar et al. |
| 2020/0031337 A1* | 1/2020 | Soltanian .......... B60W 30/0956 |
| 2020/0070816 A1* | 3/2020 | O'Donnell ............. H04R 1/326 |
| 2020/0143649 A1 | 5/2020 | Coonley et al. |
| 2020/0348687 A1 | 11/2020 | Paudel et al. |
| 2021/0104155 A1 | 4/2021 | Xu et al. |
| 2021/0125494 A1* | 4/2021 | Cho ................... G01S 3/8032 |

* cited by examiner

SENSORS FOR DETERMINING OBJECT LOCATION

CROSS-REFERENCE TO RELATED APPLICATIONS

This application claims the benefit of and priority from U.S. patent application Ser. No. 16/731,227, filed Dec. 31, 2019, entitled "SENSORS FOR DETERMINING OBJECT LOCATION," incorporated herein by reference in its entirety.

TECHNICAL FIELD

The present disclosure relates generally to determining an object and/or event location with any chassis, whether stationary or mobile, where the chassis includes a plurality of sensor arrays.

BACKGROUND ART

Parents often teach children to determine the distance of a thunderstorm by counting, for example, "one Mississippi, two Mississippi, three Mississippi" after seeing a flash of lightning. A count of "Mississippi" is approximately one second. Thus, by the time a child hears thunder associated with the flash of lightning, the child will have counted a number of seconds elapsed between the time at which the light (i.e., lightning) arrived at the child's location and the time at which the sound (i.e., thunder) arrived at the child's location. Because sound travels a mile in approximately five seconds, the distance of the storm (in miles) can be calculated by dividing the counted number of seconds by five.

Nevertheless, identifying the location of events in which an object emits light and sound is tricky. For example, counting "Mississippi" is merely an approximation of one second, and the actual elapsed time might vary. Second, sound actually travels closer to 4.7 seconds per mile. Thus, even with accurate time measurement, the above approximation inherently includes an error of approximately 5%.

Although a child might look for lightning during a storm and be prepared to count, a viewer might not be prepared to determine a distance of an explosion or illegally-launched fireworks. In particular, because the viewer might not expect the explosion or fireworks, the counting of the viewer might be delayed by the viewer's reaction time in understanding what is happening.

Thus, accurately detecting the location of such an event can be difficult.

In another example, some technologies use triangulation with at least three sensors of the same type to determine the location of an event. For example, a bang sound can be sensed by three different microphones. A processor can determine how the sound waves reached the different microphones at different times or volumes to determine the location of the source of the bang. However, with such technology, it might be difficult to determine the nature of the source of the sound.

Further, in one example as to how event determination impacts autonomous vehicles ("AVs"), AVs currently pull over to the side of the road, if audio or visual sensors of the AV sense the emergency lights or siren of an emergency vehicle. However, such an emergency vehicle might be sufficiently far away from the AV such that the AV need not pull over. Thus, the behavior of an AV can be improved by accurately determining the location of an emergency vehicle currently operating its emergency lights or siren.

The above scenarios contemplate distance but do not necessarily contemplate directionality of the event.

BRIEF SUMMARY

To address the above situation, a plurality of sensor arrays are mounted on a chassis, such as a roof of a vehicle. When one or more sensors of a first sensor array senses a first physical property of an event (e.g., a camera senses a flash of light), a processor records a current time as a first timestamp. If the first sensor array employs 360° coverage, then the processor can determine a directionality of the event based on an identity of a sensor of the first sensor array to first sense the event. In some implementations, one or more sensors of a second sensor array of the plurality of sensor arrays are tuned in the direction of the event. When one or more sensors of the second sensor array senses a second physical property of the event (e.g., a microphone senses a boom), a current time is recorded as a second timestamp.

The first physical property and the second physical property are correlated to the same event, and an inference can be made on the event based on the first physical property and the second physical property. For example, it is possible to infer the direction and distance or location of the event by modeling how the first physical property and the second physical property propagates from the event to the sensor array through space.

A processor can determine the time difference between the first timestamp and the second timestamp. In addition, the processor can determine the identity of the first physical property and the identity of the second physical property of the event. The processor can determine a speed difference between the rates of transmission of the two physical properties through space. Thus, the processor can determine a distance of the event based on the first physical property and the second physical property, e.g., by multiplying the speed by the time difference.

The processor can determine a geolocation of the event, based on the geolocation of the chassis on which the first and second sensor arrays are mounted, a directionality of the event, and a distance of the event. For example, if the geolocation of the chassis is given in an approximately Cartesian system (such as global positioning system coordinates), the processor can determine the Cartesian coordinates of the event by considering the distance as a hypotenuse of a right triangle based on the Cartesian system, where the hypotenuse extends in the direction of the directionality of the event.

Phrased differently, the processor can determine an X-displacement from the geolocation of the chassis by determining the product of (i) the distance of the event and (ii) the cosine of the directionality. The processor can determine a Y-displacement from the geolocation of the chassis by determining the product of (i) the distance of the event and (ii) the sine of the directionality.

After the processor determines the geolocation of the event by modifying the geolocation of the chassis by the determined X-displacement and Y-displacement, the processor can determine an environment at the geolocation of the event. The environment provides additional context and information for the likely source of the event. Once the source of the event is determined, the processor can take an action, based on the event or its source. Such an event can include dialing an emergency or nonemergency telephone number for first responders or guiding an AV to the side of the road.

Implementations disclosed herein might be particularly advantageous for accurately determining the location of an event involving a light and sound emission by one or more objects or by occurrence of an event. Such an advantage can be particularly pronounced when the one or more objects are partially occluded visually. For example, EMVs (Emergency Medical Vehicles) can be partially or wholly occluded for or undetectable by a light sensor array.

More broadly speaking, an event referred to by the various implementations described herein has multiple, different physical properties that can be sensed by different types of sensors. An object referred to by the various implementations can emit multiple, different physical properties that can be sensed by different types of sensors. One or more processors or circuitry can perform detection (e.g., classification, or identification) of a physical property, based on data or signals generated by a sensor. Specifically, processor or circuitry can determine whether the data or signals generated by the sensor indicate the presence of the physical property. If the signals generated by the sensor indicate the presence of the physical property, then the physical property is detected with the sensor. With an understanding or model of the different physical properties, it is possible to infer or deduce information about an event based on detections of the different physical properties.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION

Figure 1:
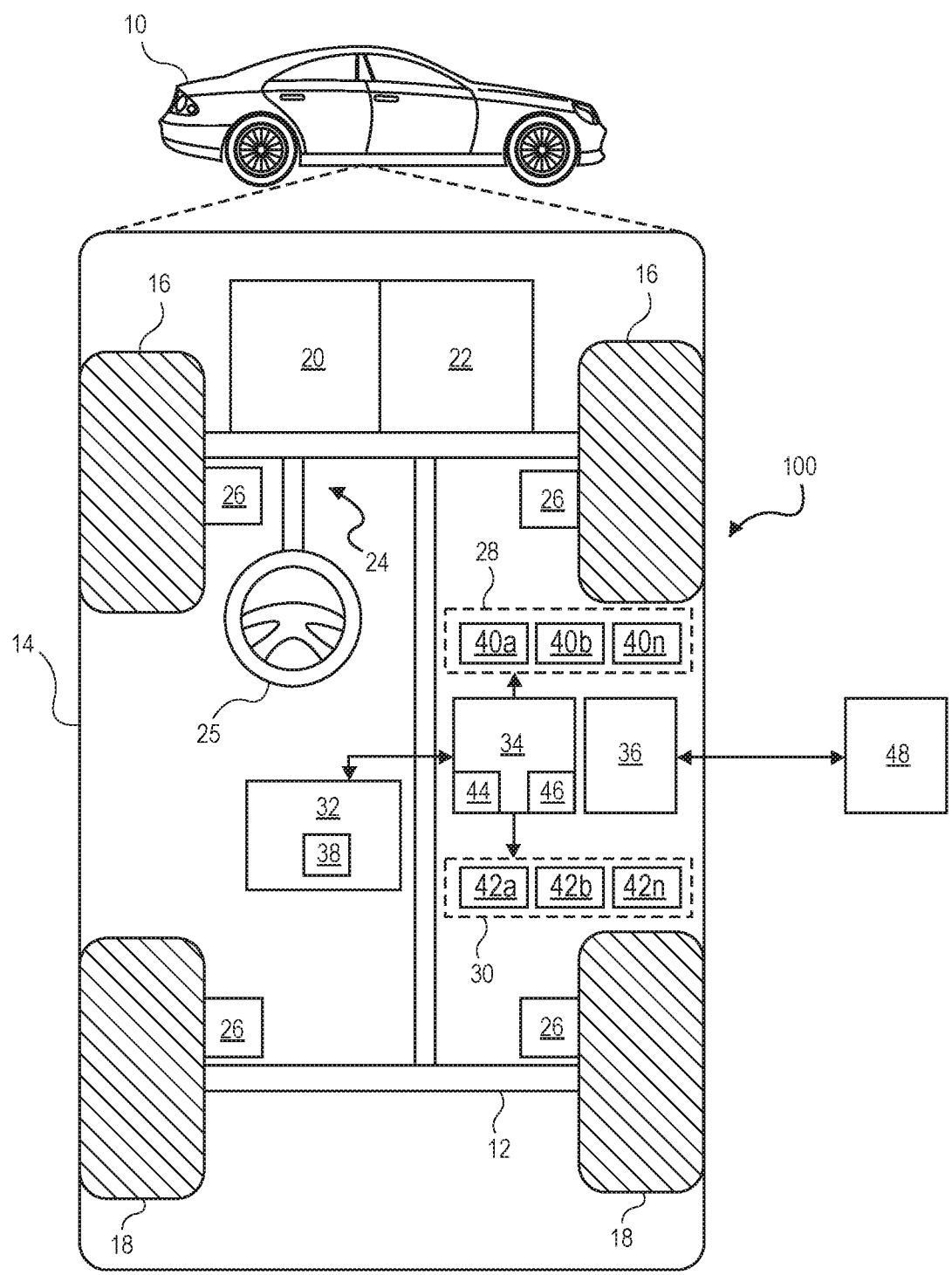
FIG. 1 illustrates an example autonomous vehicle that performs event location determination according to some implementations of the present disclosure.

The systems, methods and devices of this disclosure have several innovative aspects, no one of which is solely responsible for the attributes disclosed herein. Details of one or more implementations of the subject matter described in this specification are set forth in the description below and the accompanying drawings.

With the emergence of artificial intelligence (e.g., machine learning) and advanced audio-visual detectors, there is an opportunity to more accurately detect or identify one or more events in which one or more objects emit one or more lights followed by one or more sounds.

In one implementation according to the present disclosure, a chassis including a plurality of sensor arrays (e.g., cameras and microphones) is mounted at a vantage point on a vehicle, tall building, antenna, public infrastructure, or prominent landmark that provides a wide (e.g., 360°) field of view and audio. Such a view enables the sensor arrays to sense and enable classification or detection of events in real-time and then determine severity and an expected or suitable course of action. For example, if a video sensor mounted on an AV captures an image of an emergency vehicle ("EMV") on the right side of the AV, and an audio sensor mounted on the AV captures a siren of the EMV from the right, the vehicle can conduct appropriate maneuvers. Some examples of appropriate maneuvers include braking the AV, and pulling the AV to a shoulder of the road, opposite to the direct travel path of the approaching emergency vehicle.

Some implementations can accurately and quickly point out the location of such events on a map. This pointing out can also apply to instances of identifying one or more emergency vehicles, one or more accidents on the road or other emergency situations in which an AV executes one or more evasive maneuvers to avoid a negative outcome.

Using machine learning (such as a combination of convolutional neural networks (CNN) and deep learning), as well as audio and visual sensors (e.g., an array of multi-directional microphones and an array of multi-directional motion capturing sensors or cameras), implementations can classify an image by grabbing frames of a motion sequence from the visual sensors and identifying or classifying an audio detection as matching the event. Machine learning implementations are not limited to CNN and deep learning. For example, deep neural networks, deep belief networks, recurrent neural networks, or other types of machine learning and artificial intelligence (AI) can also be used. The detected event could be a generator explosion at ground level, a fireworks explosion many feet above the ground, or emission of emergency lights or siren by an emergency vehicle.

Taking fireworks as an example, video sensors capture the event, and artificial intelligence classifies the event as "potential fireworks." Once the image is classified, one or more audio sensors sense audio from the resulting explosion that generated the flash of light. With high directional accuracy from tuning an array of the one or more audio sensors, a processor can make a determination as to the location in longitude and latitude of the source of the event which can be pinpointed on the map. The processor can also determine relative differences in altitude between the event and the chassis on which the sensor arrays are mounted.

Exemplary Autonomous Vehicle

FIG. 1 illustrates an example AV that performs event location determination according to some implementations of the present disclosure.

As depicted in FIG. 1, autonomous vehicle 10 generally includes a chassis 12, a body 14, front wheels 16, and rear wheels 18. The body 14 is arranged on the chassis 12 and encloses components of the autonomous vehicle 10. The body 14 and the chassis 12 may jointly form a frame. The front wheels 16 and rear wheels 18 are rotationally coupled to the chassis 12 near a respective corner of the body 14. Typically, chassis 12 differs from the chassis on which the sensor arrays are mounted. For example, the sensor arrays can be mounted on the roof of the autonomous vehicle 10.

In various embodiments, the autonomous vehicle 10 is an autonomous vehicle and the system 100 and/or components thereof are incorporated into the autonomous vehicle 10. The autonomous vehicle 10 is, for example, a vehicle that is automatically controlled to carry passengers and/or cargo from one location to another. The autonomous vehicle 10 is depicted as a passenger car, and any other vehicle, including motorcycles, trucks, sport utility vehicles (SUVs), recreational vehicles (RVs), marine vessels, aircraft, and the like, can also be used.

In an example, the autonomous vehicle 10 corresponds to a level four or level five automation system under the Society of Automotive Engineers (SAE) "J3016" standard taxonomy of automated driving levels. Using this terminology, a level four system indicates "high automation," referring to a driving mode in which the automated driving system performs aspects of the dynamic driving task, even if a human driver does not respond appropriately to a request to intervene. A level five system indicates "full automation," referring to a driving mode in which the automated driving system performs aspects of the dynamic driving task under roadway and environmental conditions that can be managed by a human driver. Implementations in accordance with the present subject matter are not limited to any taxonomy or rubric of automation categories. Furthermore, systems in accordance with the present disclosure can be used in conjunction with any autonomous or other vehicle that utilizes a navigation system and/or other systems to provide route guidance.

As shown, the autonomous vehicle 10 generally includes a propulsion system 20, a transmission system 22, a steering system 24, a brake system 26, a sensor system 28, an actuator system 30, data storage device 32, controller 34, and a communication system 36. The propulsion system 20 can, in various embodiments, include an internal combustion engine, an electric machine such as a traction motor, and/or a fuel cell propulsion system. The transmission system 22 is configured to transmit power from the propulsion system 20 to the front wheels 16 and rear wheels 18 according to selectable speed ratios. According to various implementations, the transmission system 22 can include a step-ratio automatic transmission, a continuously-variable transmission, or other appropriate transmission.

The brake system 26 is configured to provide braking torque to the front wheels 16 and rear wheels 18. Brake system 26 can, in various embodiments, include friction brakes, brake by wire, a regenerative braking system such as an electric machine, and/or other appropriate braking systems.

The steering system 24 influences a position of the front wheels 16 and/or rear wheels 18. While depicted as including a steering wheel 25 for illustrative purposes, in some embodiments contemplated within the scope of the present disclosure, the steering system 24 might not include a steering wheel.

The sensor system 28 includes one or more sensing devices 40a-40n that sense observable conditions of the exterior environment and/or the interior environment of the autonomous vehicle 10. The sensing devices 40a-40n can include radars, Light Detection and Ranging sensors (LIDARs), global positioning systems, optical cameras, thermal cameras, ultrasonic sensors, speedometers, compasses, and/or other sensors. The actuator system 30 includes one or more actuator devices 42a-42n that control one or more vehicle features such as the propulsion system 20, the transmission system 22, the steering system 24, and the brake system 26. In various embodiments, autonomous vehicle 10 can also include interior and/or exterior vehicle features not illustrated in FIG. 1, such as various doors, a trunk, and cabin features such as air conditioning, music players, lighting, touch-screen display components (such as those used in connection with navigation systems), and the like.

The data storage device 32 stores data for use in automatically controlling the autonomous vehicle 10. In various implementations, the data storage device 32 stores defined maps of the navigable environment. In various implementations, the defined maps are predefined by and obtained from a remote system. For example, the defined maps are assembled by the remote system and communicated to the autonomous vehicle 10 (wirelessly and/or in a wired manner) and stored in the data storage device 32. Route information can also be stored within data storage device 32—i.e., a set of road segments (associated geographically with one or more of the defined maps) that together define a route that the user might take to travel from a start location (e.g., the user's current location) to a target location. Also, in various implementations, the data storage device 32 stores processing algorithms and data for processing three-dimensional point clouds to determine velocity of objects in the surroundings on a frame by frame basis. As will be appreciated, the data storage device 32 can be part of the controller 34, separate from the controller 34, or part of the controller 34 and part of a separate system. Data storage device 32 includes event detection software 38.

The controller 34 includes processor 44 and a computer-readable storage device or media 46. The processor 44 can be any custom-made or commercially available processor, a central processing unit (CPU), a graphics processing unit (GPU), an auxiliary processor among several processors associated with the controller 34, a semiconductor-based microprocessor (in the form of a microchip or chip set), any combination thereof, or generally any device for executing computer instructions. The computer-readable storage device or media 46 can include volatile and non-volatile storage in read-only memory (ROM), random-access memory (RAM), and keep-alive memory (KAM), for example. KAM is a persistent or non-volatile memory that can store various operating variables while the processor 44 is powered down. The computer-readable storage device or media 46 can be implemented using any of a number of memory devices such as PROMs (programmable read-only memory), EPROMs (electrically PROM), EEPROMs (electrically erasable PROM), flash memory, or any other electric, magnetic, optical, resistive, or combination memory devices capable of storing data, some of which represent executable instructions, used by the controller 34 in controlling the autonomous vehicle 10.

The instructions can include one or more separate programs that comprise an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals transmitted to the actuator system 30 to control the components of the autonomous vehicle 10 based on the logic, calculations, methods, and/or algorithms. Although a controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to control features of the autonomous vehicle 10. As discussed in detail below, controller 34 can be configured for use in processing three-dimensional imaging data of surroundings of the autonomous vehicle 10 in the form of point clouds to determine velocity on a frame by frame basis for use in autonomous control of the vehicle.

Figure 5:
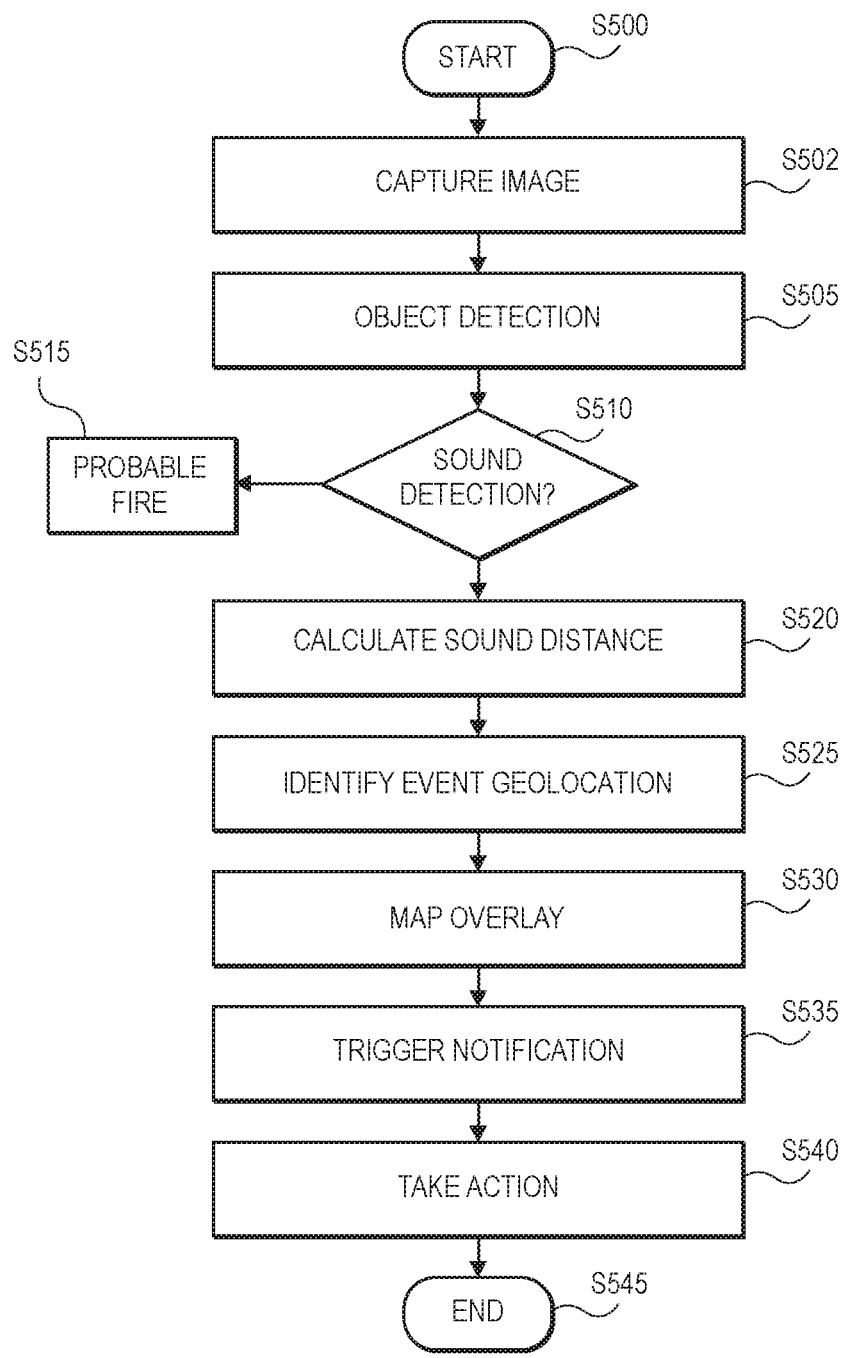
FIG. 5 illustrates a use case according to one implementation of the present disclosure.
Figure 6:
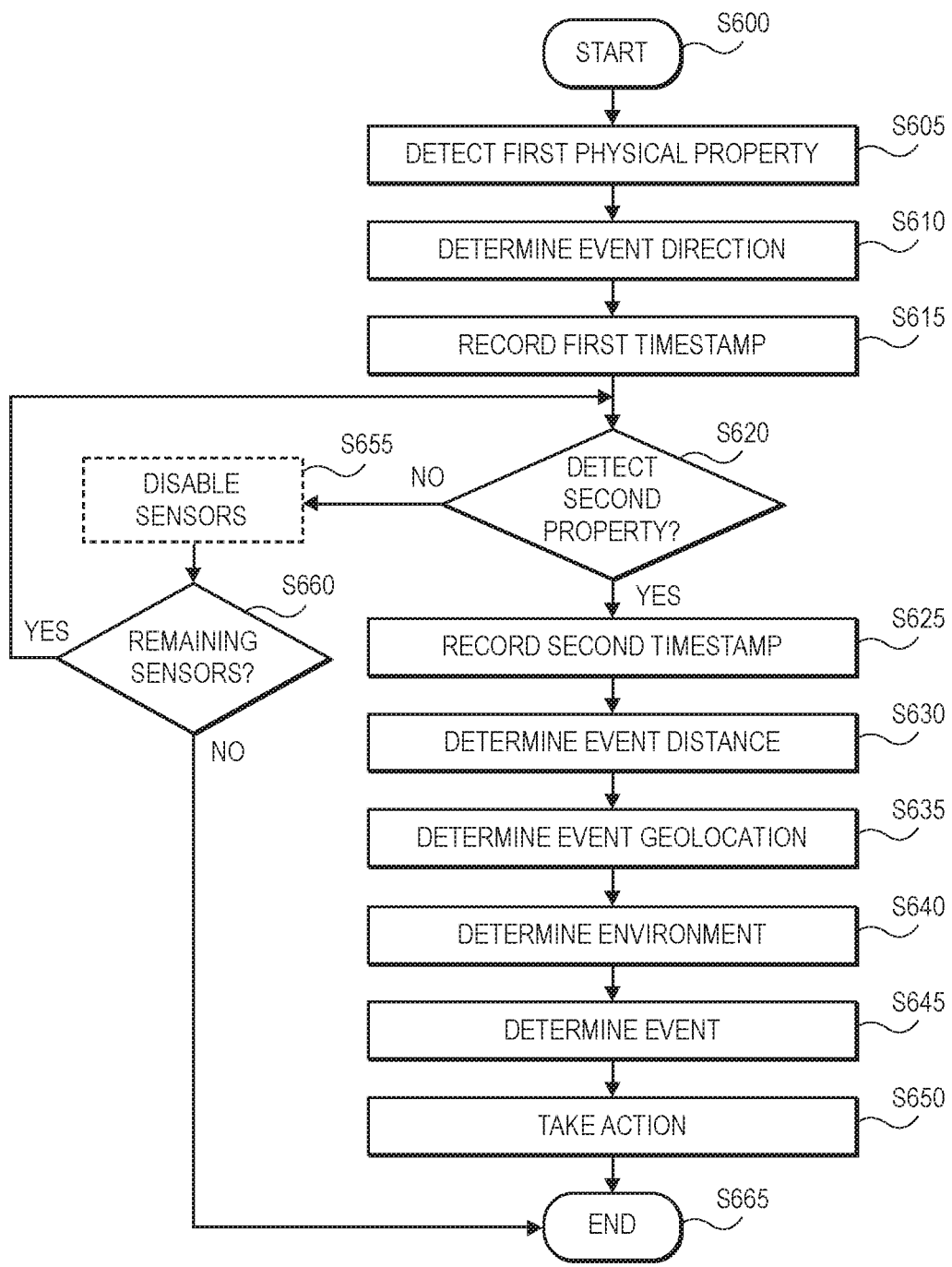
FIG. 6 illustrates a workflow for determining an event location in accordance with one implementation of the present disclosure.
Figure 7:
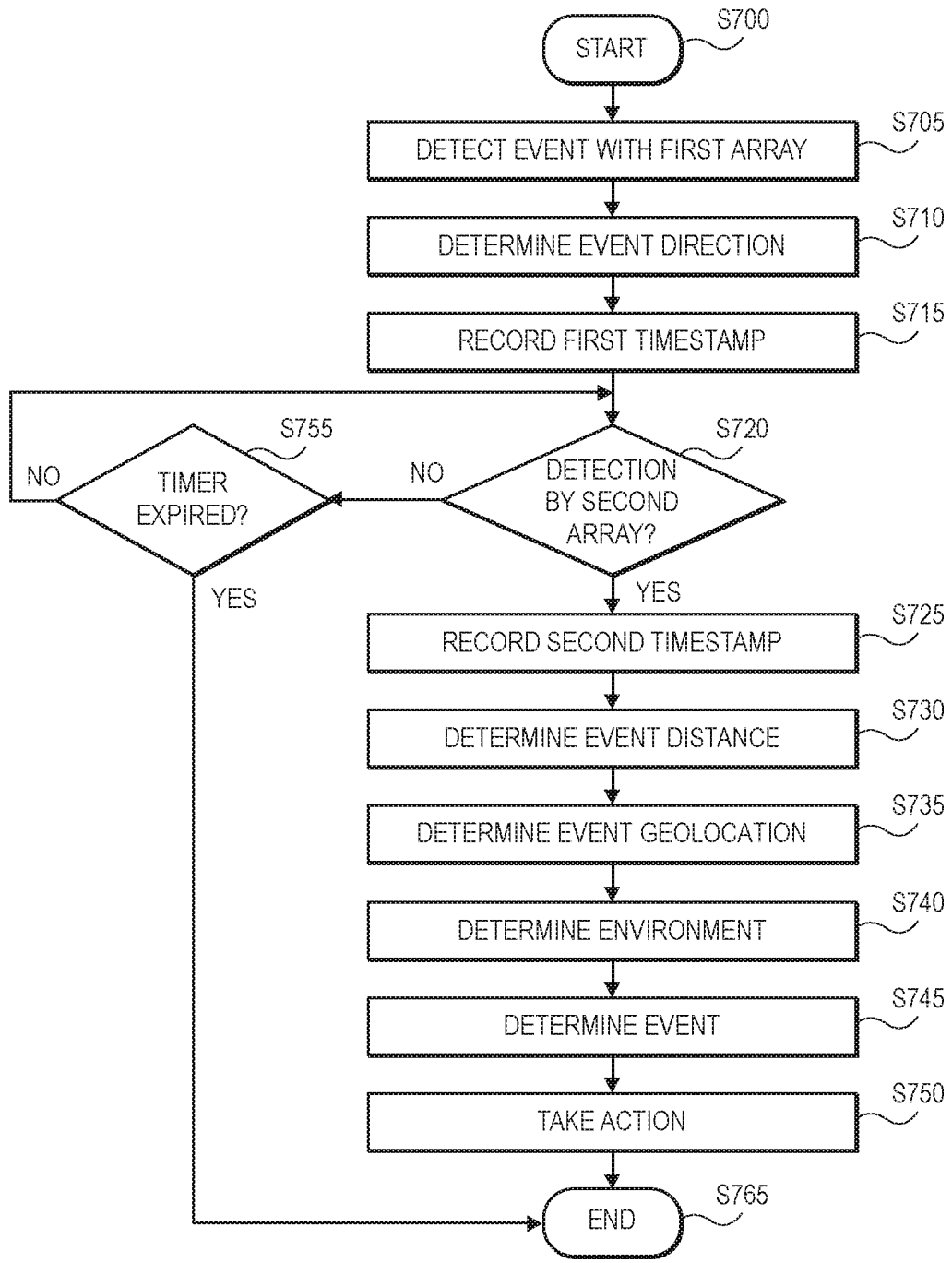
FIG. 7 illustrates a workflow for a use case of event location determination in accordance with one implementation of the present disclosure.

The processor 44 can execute event detection software 38 to perform workflows discussed in regard to aspects of FIGS. 5-7.

Figure 2:
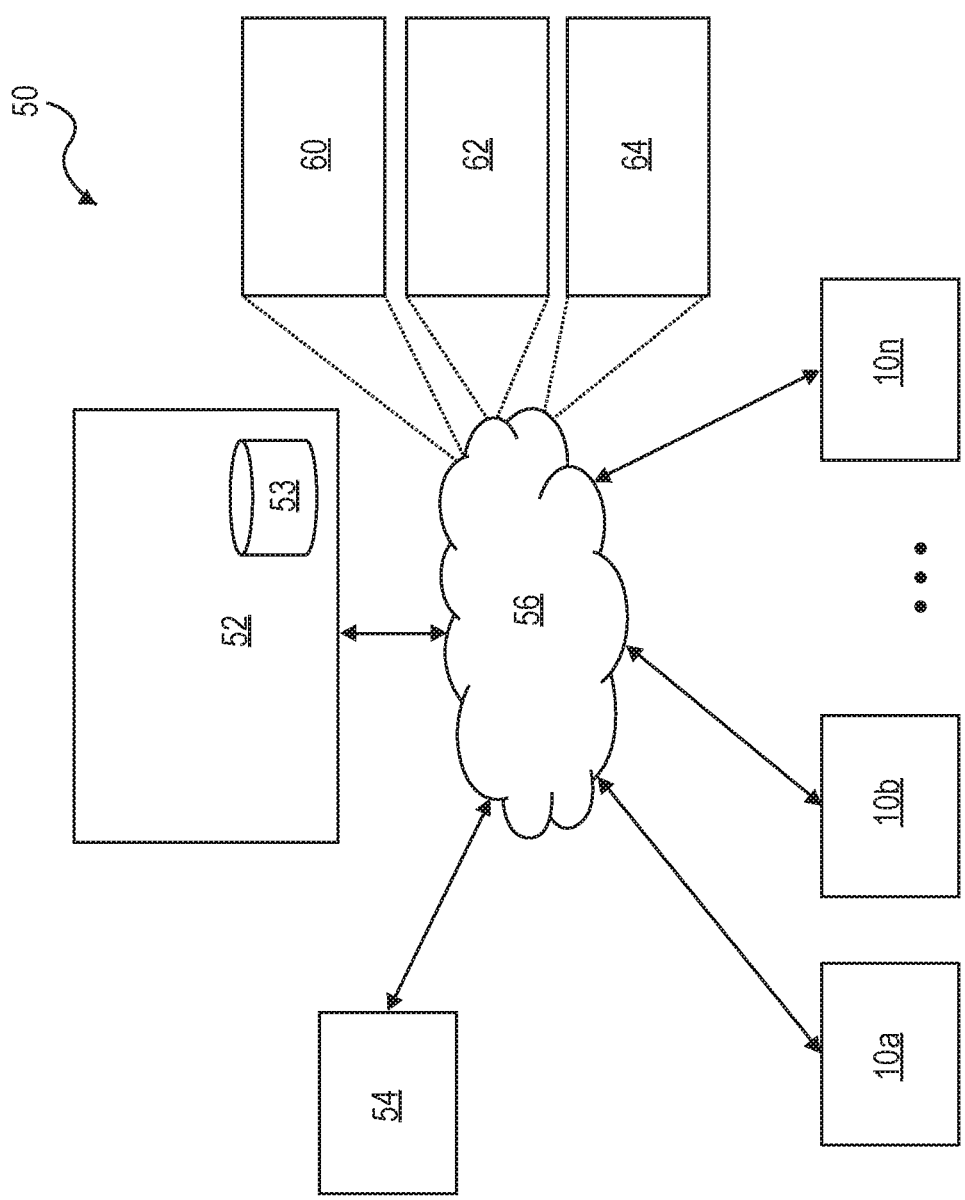
FIG. 2 is a functional block diagram illustrating a transportation system having one or more autonomous vehicles as shown in FIG. 1, in accordance with various implementations.

The communication system 36 wirelessly communicates information to and from other entities 48, such as other vehicles ("V2V" communication), infrastructure ("V2I" communication), remote transportation systems, and/or user devices (described in more detail with regard to FIG. 2). In an example, the communication system 36 is a wireless communication system configured to communicate via a wireless local area network (WLAN) using IEEE (Institute of Electrical and Electronics Engineers) 802.11 standards or by using cellular data communication. Additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

With reference now to FIG. 2, in various implementations, the autonomous vehicle 10 described with regard to FIG. 1 is suitable for use in the context of a taxi or shuttle system in a certain geographical area (e.g., a city, a school or business campus, a shopping center, an amusement park, an event center, or the like) or management by a remote system. For example, the autonomous vehicle 10 can be associated with an autonomous vehicle-based remote transportation system. FIG. 2 illustrates an exemplary implementation of an operating environment shown generally at 50 that includes a remote transportation system 52 associated with one or more autonomous vehicles 10a-10n as described with regard to FIG. 1. In various implementations, the operating environment 50 (a part of which may correspond to entities 48 shown in FIG. 1) further includes one or more user devices 54 that communicate with the autonomous vehicle 10 and/or the remote transportation system 52 via a communication network 56.

The communication network 56 supports communication between devices, systems, and components supported by the operating environment 50 (e.g., via tangible communication links and/or wireless communication links). For example, the communication network 56 can include a wireless carrier system 60 such as a cellular telephone system that includes a plurality of cell towers (not shown), one or more mobile switching centers (MSCs) (not shown), as well as any other networking components that connect the wireless carrier system 60 with a land communications system. The cell towers include sending and receiving antennas and a base station, with the base stations from different cell towers connected to the MSC either directly or via intermediary equipment such as a base station controller. The wireless carrier system 60 can implement any suitable communications technology, including for example, digital technologies such as Code Division Multiple Access (CDMA) (e.g., CDMA2000), Long-Term Evolution (LTE) (e.g., fourth generation (4G) LTE or fifth generation (5G) LTE), Global System for Mobile Communications/General Packet Radio Service (GSM/GPRS), or other current or emerging wireless technologies. Other cell tower/base station/mobile switching center (MSC) arrangements can be used with the wireless carrier system 60. For example, the base station and cell tower can be co-located at the same site or remotely located from one another, a base station can be responsible for one cell tower or one base station can service various cell towers, or various base stations can be coupled to one MSC, to name a few possible arrangements.

Apart from including the wireless carrier system 60, a second wireless carrier system in the form of a satellite communication system 64 can be included to provide uni-directional or bi-directional communication with the autonomous vehicles 10a-10n. This provision can use one or more communication satellites (not shown) and an uplink transmitting station (not shown). Uni-directional communication can include, for example, satellite radio services, where programming content (e.g., news, music, etc.) is received by the transmitting station, packaged for upload, and then sent to the satellite, which broadcasts the programming to subscribers. Bi-directional communication can include, for example, satellite telephony services using the satellite to relay telephone communications between the autonomous vehicle 10 and the station. The satellite telephony can be used either in addition to or in lieu of the wireless carrier system 60.

A land communication system 62 can further be included as a land-based telecommunications network connected to one or more landline telephones and that connects the wireless carrier system 60 to the remote transportation system 52. For example, the land communication system 62 can include a public switched telephone network (PSTN) such as that used to provide hardwired telephony, packet-switched data communications, and the Internet infrastructure. One or more segments of the land communication system 62 can be implemented using a wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62 and can include wireless telephony equipment so that the remote transportation system 52 can communicate directly with a wireless network, such as the wireless carrier system 60.

Although one user device 54 is shown in FIG. 2, embodiments of the operating environment 50 can support any number of user devices, including multiple user devices owned, operated, or otherwise used by one person. A user device 54 supported by the operating environment 50 can be implemented using any suitable hardware platform. In this regard, the user device 54 can be realized in any common form factor including: a desktop computer; a mobile computer (e.g., a tablet computer, a laptop computer, or a netbook computer); a smartphone; a video game device; a digital media player; a component of a home entertainment equipment; a digital camera or video camera; a wearable computing device (e.g., smart watch, smart glasses, smart clothing); or the like. A user device 54 supported by the operating environment 50 can be realized as a computer-implemented or computer-based device having the hardware, software, firmware, and/or processing logic to carry out various techniques and methodologies described herein. For example, the user device 54 includes a microprocessor in the form of a programmable device that includes one or more instructions stored in an internal memory structure and applied to receive binary input to create binary output. In some embodiments, the user device 54 includes a global positioning system (GPS) module that receives GPS satellite signals and generates GPS coordinates based on those signals. In other embodiments, the user device 54 includes cellular communications functionality such that the user device 54 carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems (not shown), which may be cloud-based, network-based, or resident at the campus or geographical location serviced by the remote transportation system 52. The remote transportation system 52 can be manned by a live advisor, an automated advisor, an artificial intelligence system, or a combination thereof. The remote transportation system 52 can communicate with the user device 54 and the autonomous vehicles 10a-10n to schedule rides, dispatch autonomous vehicles 10a-10n, and the like. In various embodiments, the remote transportation system 52 stores store account information such as subscriber authentication information, vehicle identifiers, profile records, biometric data, behavioral patterns, and other pertinent subscriber information. As described in further detail below, remote transportation system 52 can include a route database 53 that stores information relating to navigational system routes, including whether and to what extent route segments are impacted by events that have been detected by one or more of autonomous vehicles 10a-10n.

In accordance with a use case workflow, a registered user of the remote transportation system 52 can create a ride request via the user device 54. The ride request will typically indicate the passenger's pickup location (or current GPS location), the destination location (which may identify a predefined vehicle stop and/or a user-specified passenger destination), and a pickup time. The remote transportation system 52 receives the ride request, processes the request, and dispatches a selected one of the autonomous vehicles 10a-10n (when and if one is available) to pick up the passenger at the designated pickup location and at the appropriate time. The remote transportation system 52 can also generate and send a suitably configured confirmation message or notification to the user device 54 to let the passenger know that a vehicle is on the way.

Communication system 36 can communicate various information with communication network 56. For example, communication system 36 can transmit the identity of events detected with the workflows of the present disclosure. In addition, communication system 36 can receive headings (e.g., True North) from communication network 56 aided by, e.g., satellite communication system 64.

As illustrated in FIG. 1, sensing devices 40a-40n can include one or more cameras or other light sensors, microphones or other acoustic sensors, other sensors, such as wind speed, temperature, pressure, and humidity sensors, and/or a compass. The event determination described in this disclosure is based on sensory data provided by the sensing devices 40a-40n.

In many implementations, the sensing devices 40a-40n provide 360° coverage. In the case of cameras, 360° coverage can be achieved by mounting at least two lenses at the top of a chassis (e.g., the top of an AV or generally toward the top of an antenna). The at least two lenses can provide images that are stitched together at the edges of the images. These lenses can be included in one camera or in a plurality of cameras. Of course, if the sensing devices 40a-40n include more than two lenses, then the angle coverage can correspondingly be decreased. For example, four lenses can achieve 360° coverage, if the lenses provide approximately 90° coverage.

In some AV implementations, two cameras are mounted just above the inside rear-view mirror in the top-center of the windshield. In such an implementation, two cameras are provided to achieve stereoscopic vision and, thus, an ability to perceive distance from the cameras. Similarly, two cameras can be provided in the rear windshield or bumper for stereoscopic vision in reverse. Of course, other implementations are possible, such as including one or more cameras on the driver and/or passenger sides of the vehicle.

In the case of sensing devices 40a-40n being implemented as acoustic sensors, directionality of a detected event can be determined based on which one or more of the acoustic sensors in the array first detects the sound. These acoustic sensors will be closer to the source of the sound than the other acoustic sensors.

In another implementation, sensing devices 40a-40n are implemented as microphones having beamforming abilities. Although the beamforming abilities are not necessarily used for an initial detection of an event, such beamforming abilities are particularly beneficial if the acoustic sensors are tuned in a direction after other sensing devices 40a-40n (e.g., cameras) detect a different physical attribute of the event. For example, if the cameras first detect an event in a direction (e.g., northeast), then the acoustic sensors can be moved or can beamform in similar directions. These similar directions can be the same direction (e.g., northeast). Of course, the similar directions need not be the same direction: the beamforming direction can be modified based on a relative location of an acoustic sensor relative to the other acoustic sensors in the array.

For example, if the acoustic sensors are implemented in a circle mounted on the top of an AV, then an eastmost acoustic sensor might beamform to the north, a northmost acoustic sensor might beamform to the east, and a northeastmost acoustic sensor might beamform to the northeast. Such variation in beamforming directions might increase the sensitivity of the array to the specific direction of the detected event. This increased sensitivity can be used as a basis for processor 44 to more precisely determine the location of the event.

In some implementations, these sensors are distributed symmetrically around the vehicle. Implementations in which the sensors are asymmetrically distributed are also possible, such as to favor a particular directionality (e.g., at least one additional camera at the front of the vehicle, as compared to the sides or rear of the vehicle, in view of the fact that vehicles spend most of their time traveling forward).

Such 360° coverage is not limited to video cameras and can be extended to microphones, LIDAR sensors, radar sensors, wind sensors, humidity sensors, and any other type of sensor. Some such sensors might provide 360° coverage with one sensor, such as a wind sensor.

Processor 44 can determine the directionality of sensing by the sensing devices 40a-40n in multiple manners. In one implementation, the directionality is absolute, such as by using a compass or receiving directional data from a remote mapping or GPS device. In another implementation, the directionality is relative, based on predetermined locations of the sensing devices 40a-40n on the chassis. For example, sensing devices 40a-40n can be assigned device IDs, such that processor 44 can determine the directionality of a detected event based on the device ID of the sensor that detected the event.

Thus, upon determining an event, the processor 44 can instruct the steering system 24 to influence a position of the front wheels 16 and/or rear wheels 18, such as guiding the autonomous vehicle 10 to the side of the road. Similarly, upon determining an event, the processor 44 can instruct the brake system 26 apply a braking torque to the front wheels 16 and rear wheels 18. In other implementations, the processor 44 can instruct communication system 36 to contact a first responder service.

Illustrative Example

Figure 3:
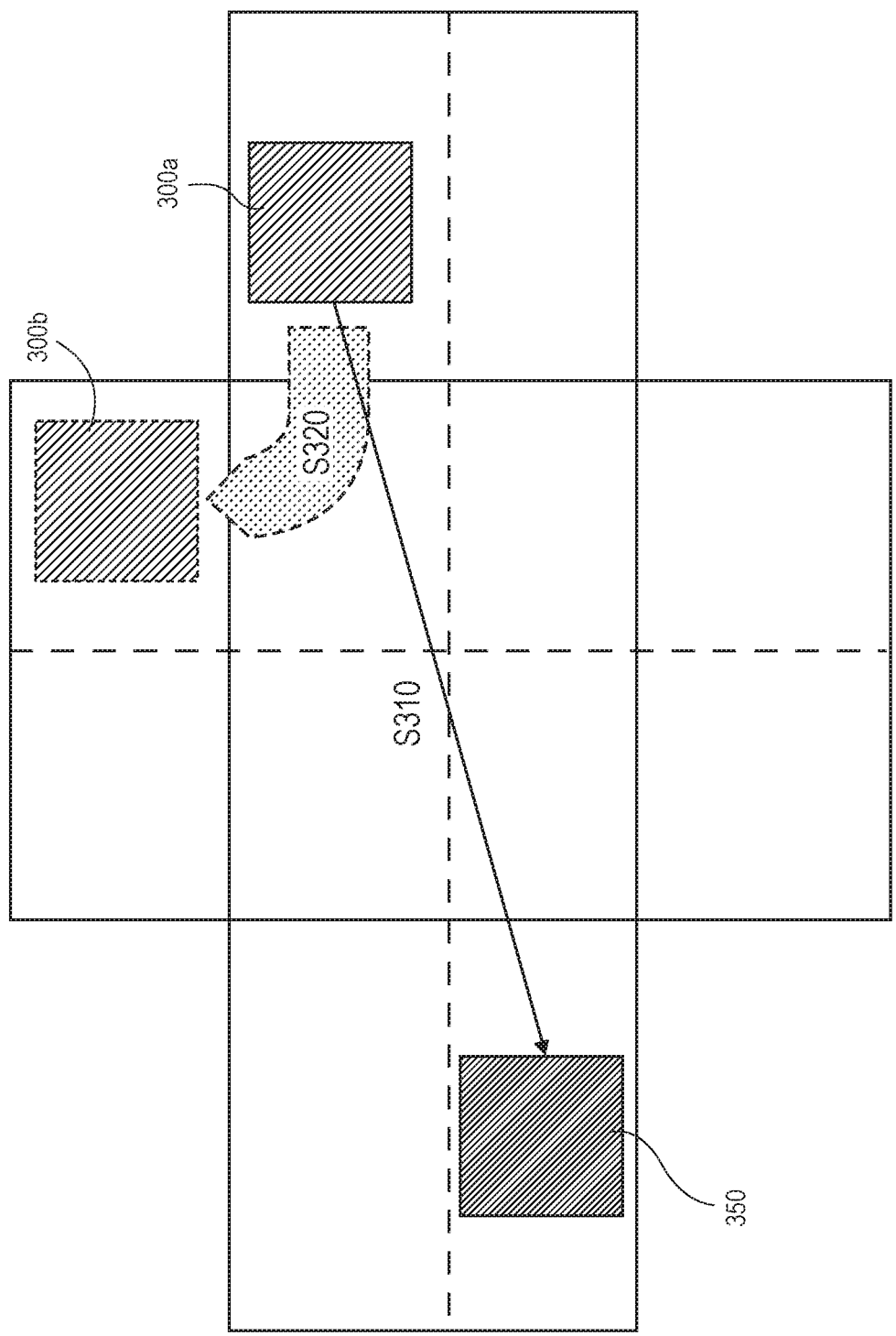
FIG. 3 illustrates an overhead map of an AV encountering an emergency vehicle, according to some embodiments of the present disclosure.

FIG. 3 illustrates an overhead map of an AV 300a encountering an EMV 350, according to some implementations of the present disclosure. In FIG. 3, AV 300a is traveling leftward on the page, and EMV 350 is traveling rightward. AV 300a detects the EMV 350 using two sensor arrays in accordance with the present disclosure and is guided to a new position 300b on the side of the road.

In particular, in a first case, the AV 300a first detects S310 emergency lights from the EMV 350 with a light sensor, because light travels faster than sound. The AV 300a records a first timestamp indicating a time of this first detection. In some implementations, the AV 300a can move or use beamforming to cause its acoustic sensors (e.g., microphones) to face forward (i.e., in the direction of travel of the AV 300a to the left of the page). The AV 300a then detects S310 a siren of the EMV 350 with an acoustic sensor. The AV 300a records a second timestamp indicating a time of this second detection.

In a second case, the AV 300a first detects S301 a siren of the EMV 350 with an acoustic sensor, because the emergency lights of the EMV 350 are occluded by traffic. Again, the AV 300a records a first timestamp indicating a time of this first detection. In some implementations, the AV 300a can tilt or otherwise move its cameras to face forward (i.e., in the direction of travel of the AV 300a to the left of the page). The AV 300a then detects the emergency lights of the EMV 350 with one of the cameras, when the traffic has passed, and the emergency lights are no longer occluded. The AV 300a records a second timestamp indicating a time of this second detection.

Thus, in this second case, the acoustic sensor of AV 300a detects EMV 350 earlier than the camera of the AV. Because the AV 300a is traveling toward EMV 350, and EMV 350 is traveling toward AV 300a, an initial partial visual occlusion of the emergency lights of EMV 350 creates an emergency scenario in which multi-arrayed sensors of the AV 300a are more useful than one array of sensors.

A processor of AV 300a determines the difference between the first timestamp and the second timestamp. Based on that difference, the processor of the AV 300a can determine how distant the EMV 350 is from the AV 300a by multiplying the difference by the speed of the second physical property (i.e., sound in the first case, light in the second case). In some implementations, the processor of the AV 300a can also determine the direction in which the EMV 350 is traveling, based on a change in distance of the EMV 350 over time.

The processor of AV 300a can determine the direction of the EMV 350, based on a direction in which sensors of the sensor arrays (i.e., cameras in the first case, acoustic sensors in the second case) first sensed and enabled the detection of the EMV 350. In some implementations, the direction can be confirmed based on which sensors of the sensor arrays (i.e., acoustic sensors in the first case, cameras in the second case) second sensed and enabled the detection of the EMV 350.

The processor of AV 300a can determine an X-displacement and a Y-displacement of the EMV 350 relative to the front of the AV 300a. Specifically, the processor can determine an X-displacement of the EMV 350 from the AV 300a (down in FIG. 3) by determining the product of (i) the distance of the EMV 350 from the AV 300a and (ii) the sine of the angle between the front of the AV 300a and the EMV 350. Similarly, the processor can determine a Y-displacement of the EMV 350 from the AV 300a (left in FIG. 3) by determining the product of (i) the distance of the EMV 350 from the AV 300a and (ii) the cosine of the angle between the front of the AV 300a and the EMV 350.

The processor of AV 300a can receive the GPS coordinates of the AV 300a. In one implementation, the processor receives the GPS coordinates of the AV 300a from communication network 56 aided by, e.g., satellite communication system 64. The processor then modifies the GPS coordinates by the previously determined X-displacement and the Y-displacement.

The processor of the AV 300a can then determine the environment surrounding the EMV 350 by querying the modified GPS coordinates in, for example, Google Maps or Bing Maps. Such an environmental determination can be made, e.g., as to whether the road on which AV 300a and EMV 350 has a barrier dividing the opposing lanes.

As illustrated in FIG. 3, the processor 44 determines no barrier is present between AV 300a and EMV 350. So, the processor of the AV 300a controls the steering system 24 to influence the position of the front wheels 16 and/or rear wheels 18. In particular, the steering system 24 steers S320 the AV 300a to the side of the road, as illustrated by 300b.

Functional Implementation

Figure 4:
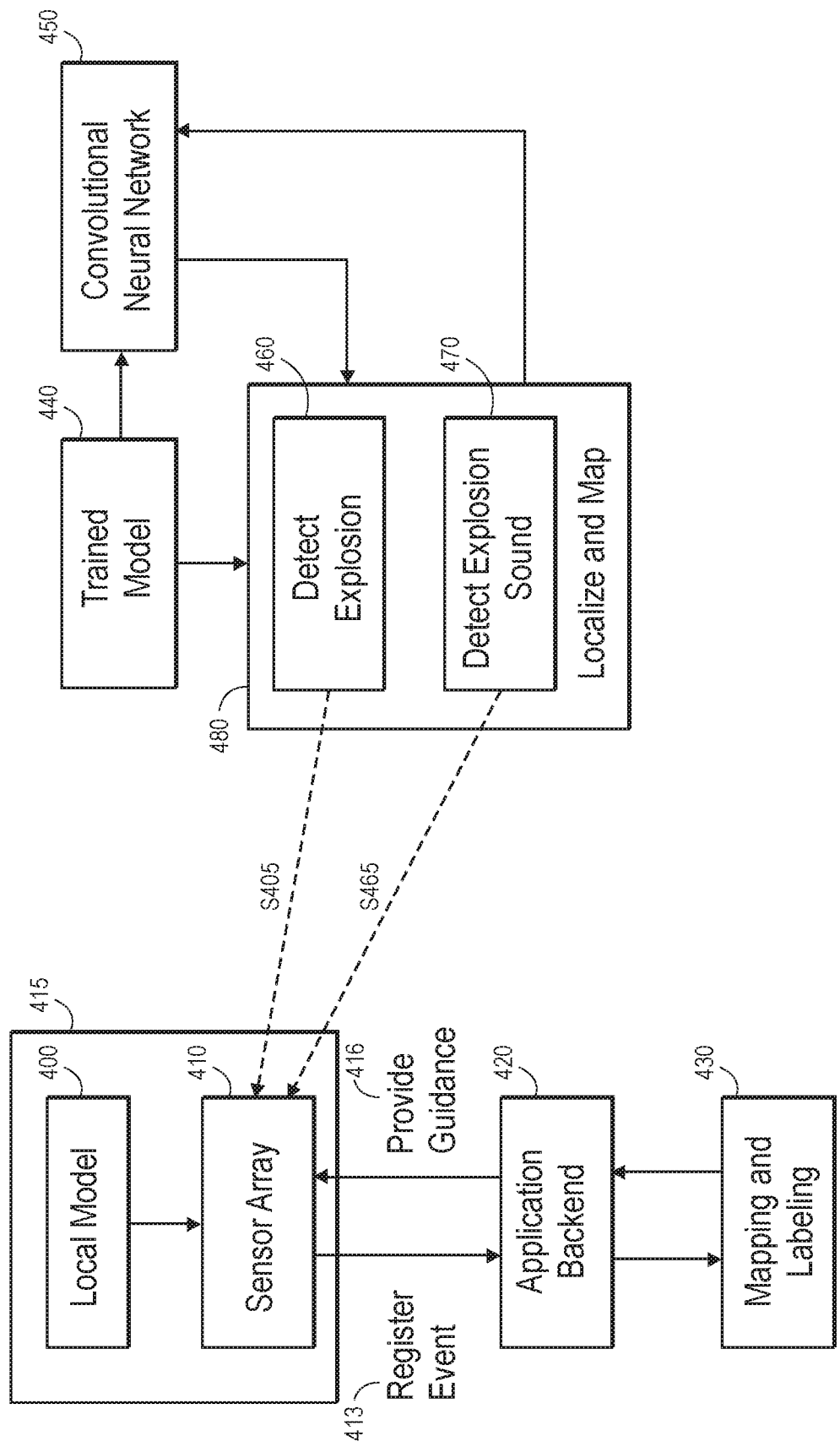
FIG. 4 illustrates a functional implementation of a system according to the present disclosure.

FIG. 4 illustrates a functional implementation of a system according to the present disclosure. Because FIG. 4 focuses on particular functions, it is not intended to be structurally limiting. For example, AV 415 can include trained model 440 and perform the localization and mapping 480, although illustrated separately. A processor of AV 415 can implement any one or more of the processing functions described in relation to FIG. 4.

In FIG. 4, light from an explosion is first sensed or received by a camera of a sensor array 410. The camera captures, through a lens, individual image frames of the explosion using a charge-coupled device.

In S405, the processor of AV 415 receives the image frames from the camera of the sensor array 410 and detects explosion (illustrated by 460), within one of the image frames. In particular, the processor identifies an object in one of the image frames as separate from its surroundings by performing edge detection on the object to determine its boundaries. The processor performs this edge detection based, for example, on differences in image brightness between regions of the object and pixels surrounding the object.

In addition, the processor performs object identification using a local model 400. In one implementation, the local model 400 is a supervised "trained" model built through artificial intelligence and machine learning on a set of several thousand pre-categorized image examples of explosions, EMVs, etc. In addition, the local model 400 can include an "untrained" model, where processor seeks pixel disturbances in image areas where no such disturbance is expected. If the processor determines an image area includes such a pixel disturbance, the processor determines an event (e.g., an explosion) has been detected. In other implementations, the local model 400 can be replaced by or supplemented with a neural detector, an anomaly detector, and/or a sudden change detector.

The local model 400 can be stored in AV 415 on a low-latency device, such as a solid-state hard drive.

The processor can translate a location (e.g., pixel location) of the detected explosion in an image frame to an angle θ relative to the camera of the sensor array 410, based on an established field of view of the camera. The angle can be used to determine directionality of the detected explosion.

The processor then records a first timestamp of the image frame including the object, e.g., the detected explosion.

An acoustic sensor of the sensor array 410 senses an explosion sound.

In S465, the processor processes audio signals from the acoustic sensor of the sensor array 410 and detects explosion sound 470. In one implementation, the processor receives the audio signals and identifies a signature of the explosion sound in the audio signals, using the local model 400. Again, the local model 400 can include a supervised "trained" model built through a set of several thousand pre-categorized audio examples of explosions, EMVs, etc. In addition, local model 400 can also include an "untrained" model.

The processor records a second timestamp at which the acoustic sensor of the sensor array 410 sensed the explosion sound.

The processor can determine an angle θ between the explosion sound and an absolute (e.g., north) or a relative (e.g., forward direction of AV) axis by identifying which microphone of the sensor array first sensed the explosion sound. The angle θ can be defined as the angle between a microphone facing in the forward direction of travel of the AV (i.e., in the direction of a hood of the AV) and the direction in which the first microphone to sense the explosion faces. The angle θ can alternatively be defined as the angle between north (whether the True North, Grid North Magnetic North, and Google Maps North) and the direction in which the first microphone to sense the explosion faces.

The processor determines a difference between the first and second timestamps. The processor can determine the distance from the sensor array 410 to the event (e.g., an explosion) by multiplying the timestamp difference by the speed of the sound, because the light from the event arrived at the sensor array 410 before the sound arrived at the sensor array 410.

Specifically, the processor can determine an X-displacement of the explosion from the AV 415 by determining the product of θ and the distance of the explosion from the AV 415. Similarly, the processor can determine a Y-displacement of the explosion from the AV 415 by determining the product of θ and the distance of the explosion from the AV 415.

The processor can then receive a geolocation (e.g., GPS coordinates) of the AV 415. The processor can determine a geolocation of the explosion by modifying the geolocation of the AV 415 by the X-displacement and the Y-displacement.

The processor then registers 413 a geolocation of the explosion with the application backend 420. In some implementations, the processor also transmits the image frames in which the explosion occurs or a signature thereof and/or an audio recording of the explosion sound or a signature thereof.

The application backend 420 provides mapping and labelling 430. In the mapping, the geolocation is mapped using, e.g., Google Maps or Bing Maps. That is, the application backend 420 determines where the geolocation of the explosion is located on a map and the environment (e.g., rural, urban, body of water, forest) at that geolocation.

In the labelling of mapping and labelling 430, the application backend 420 labels the event as, e.g., an explosion. The application backend 420 can perform this labelling based on the image frames in which the explosion occurs or a signature thereof and/or an audio recording of the explosion sound or a signature thereof.

The application backend 420 provides guidance 416 including the mapped location and any event labels. The detected explosion and sound can then be localized and mapped 480. That is, the application backend 420 can determine the location of the explosion on a map, as well as nearby geographical features. The application backend 420 can instruct the AV 415 to take action, such as by finding an alternative route (e.g., in the presence of a forest fire) or by steering the AV 415 to the side of the road (e.g., if there is no barrier between the AV 415 and an approaching EMV).

Local model 400 can implement any suitable artificial intelligence models to perform detections (e.g., 460 and 470).

Additionally or alternatively, the detections (e.g., 460 and 470) can be performed based on trained model 440, comprising or cooperating with, e.g., a convolutional neural network (ConvNet) 450. In one implementation, the ConvNet 450 is implemented with Google TensorFlow. The image frames including the detected explosion or a signature thereof, as well as an audio recording of the explosion or a signature thereof, can be transmitted to the ConvNet 450. The ConvNet 450 can output explosion detection result and/or explosion sound detection result, based on the image frames and/or audio recording.

The trained model 440 can detect the explosion within the frames or explosion sound (i.e., sound of an explosion) within the recording. In one implementation, trained model 440 is a supervised "trained" model, in which training data, such as images of explosions or audio recordings of explosions, are supplied to the trained model 440.

Alternatively or in addition, an untrained model is provided, where the untrained model seeks pixel disturbances in image areas where no such disturbance is expected. If the untrained model determines an image area includes such a pixel disturbance, the untrained model determines an event (e.g., an explosion) has been detected.

Alternatively or in addition, an untrained model can seek audio disturbances or high levels of energy in audio recordings where no such disturbance or energy is expected (e.g., detecting a loud sound relative to ambient noise). If the untrained model determines that the audio signal or audio recordings includes such a disturbance or energy, the untrained model determines an event (e.g., an explosion sound) has been detected.

In other implementations, ConvNet 450 can be replaced by or supplemented with a neural detector, an anomaly detector, and/or a sudden change detector.

The localization and mapping 480 illustrates the process or function of determining the angle, the difference between the timestamps, distance to the event, X-displacement and Y-displacement, and geolocation, as described above. Thus, the localization and mapping 480 can provide mapping of the geolocation using, e.g., Google Maps. That is, the localization and mapping 480 determines where the geolocation of the explosion is located on a map and the environment (e.g., rural, urban, body of water, forest) at that geolocation. The localization and mapping 480 also provides localization in which the trained model 440 and/or ConvNet 450 labels the event as, e.g., an explosion. The application backend 420 can perform this labelling based on the image frames in which the explosion occurs or a signature thereof and/or an audio recording of the explosion or a signature thereof.

Thus, the processor of the AV 415 determines the location of the explosion on a map, as well as nearby geographical features. The processor of the AV 415 can take action based on these geographical features, such as finding an alternative route (e.g., in the presence of a forest fire) or steering to the side of the road (e.g., if there is no barrier between the AV 415 and an approaching EMV).

Workflows and Use Cases

FIG. 5 illustrates a simplified use case according to one implementation of the present disclosure. First, the use case begins at S500, in which a camera of the sensor array captures an image frame at S502.

Then, a processor detects within the image frame an object at S505. In one implementation, the processor can detect the object by first determining edges based on differences in image brightness between regions of a potential object and pixels surrounding the potential object. The processor can then detect the object from a potential object, based on color or gradients thereof between the edges. In some implementations, the processor distinguishes dynamic objects such as explosions from static objects such as other vehicles or traffic lights. The processor can detect objects and/or explosions using a trained or untrained model as described herein.

In implementations in which the sensor array provides 360° coverage, the processor can determine an angle $\theta$ between the object and an axis (e.g., north or a forward direction of a vehicle).

The processor can optionally tune (e.g., move, tilt, or implement beamforming with) acoustic sensors of the sensor array based on the angle $\theta$.

A processor can determine if sound is received by an acoustic sensor of the sensor array at S510, by processing audio signals generated by the acoustic sensor. Specifically, the processor can determine if the sound received is associated with an explosion. The processor can detect sounds and/or explosion sounds using a trained or untrained model as described herein.

If an explosion sound is not detected at S510, then the processor of the system may assume the event is probably a fire at S515.

If an explosion sound is detected at S510, the processor calculates a distance of the event based on the speed of the sound at S520. For example, in an implementation in which the chassis also includes humidity or wind velocity sensors, the processor can correct a speed of the sound based on a measured humidity or a speed and direction of the wind. The processor can also refine its estimate of $\theta$.

The system identifies a longitude and latitude of the event, based on the distance and the location of the system, at S525. Specifically, the processor can determine an X-displacement of the explosion from the AV 300a by determining the product of $\theta$ and the distance of the explosion from the AV 300a. Similarly, the processor can determine a Y-displacement of the explosion from the AV 300a by determining the product of $\theta$ and the distance of the explosion from the AV 300a.

The system overlays the longitude and latitude on a map at S530 and triggers an appropriate notification at S535.

The system can then take an appropriate action at S540. The use case concludes at S545.

Other features and advantages of the disclosure will be apparent from the following description and the claims.

FIG. 6 illustrates a workflow for determining an event location in accordance with one implementation of the present disclosure. In the workflow of FIG. 6, a chassis includes a first sensor array and a second sensor array. A location determination module can use data from first and second sensor arrays to detect of physical properties of the event. The physical properties can be a sound, a light, a wind speed, a temperature, an air pressure, and a humidity, as well as any other physical property.

The workflow begins at S600 and proceeds to S605.

In S605, a first physical property of the event can be detected. A location determination module can detect the first physical property using a trained or untrained model as described herein, based on data from a first sensor array.

In implementations in which the first sensor array is directional, the location determination module determines a direction of the event at S610. For example, location determination module can determine the first sensor of the sensor array to sense the physical property is the closest to the event.

The location determination module then records in S615 a timestamp of the first detection, which is sensed by the first sensor array in S505.

In some implementations, the second sensor array is tuned to the direction of the event.

In S620, the location determination module determines if a second physical property of the event is detected, based on data from a second sensor array. The second physical property generally is not the same physical property as the first physical property. The location determination module can detect the second physical property using a trained or untrained model as described herein.

If the location determination module determines the second sensor array has sensed the second physical property of the event, the location determination module records at S525 the timestamp of the second detection.

In S630, the location determination module determines the distance of the event, based on the first and second timestamps, the first and second physical properties, and the velocity of a chassis including the sensor arrays.

For example, the location determination module receives or otherwise determines a speed at which the physical properties travel. More specifically, the location determination module can calculate the distance of the event, based on the speed of light being 299,792,458 meters per second, the speed of sound nominally being 343 meters per second, and a wind speed being its own speed. Further, the location determination module determines the time difference between the first and second timestamps. Thus, the location determination module can determine that the distance is nominally equal to the difference between the second and first timestamps multiplied by the speed of the second physical property.

The location determination module can also account for the Doppler effect for continuous sounds, because the module receives the velocity of the chassis. For example, the location determination module can receive the velocity of the chassis from a speedometer of an AV. Of course, in some implementations, the velocity of the chassis is zero, when the chassis is stationary.

In S635, the location determination module determines the geolocation (e.g., longitude and latitude) of the event, based on the direction, distance, and geolocation of the chassis. For example, the location determination module can receive the GPS coordinates of the chassis. In implementations in which the sensor arrays are stationary, the location determination module can be programmed with the coordinates. In implementations in which the chassis is mobile (e.g., mounted on an autonomous vehicle), the location determination module can receive the coordinates from a local GPS receiver. Other alternatives for ground positioning technology include GLONASS (Globalnaya Navigatsionnaya Sputnikovaya Sistema), DORIS (Doppler Orbitography and Radiopositioning Integrated by Satellite), BeiDou/COMPASS, Galileo, IRNSS (Indian Regional Navigation Satellite System), and Quasi-Zenith Satellite System (QZSS). Other implementations include cellular and Wi-Fi positioning.

From the geolocation of the sensor arrays, the location determination module can determine the geolocation (e.g., latitude and longitude) of the event in the direction and at the distance from the chassis.

In S640, the location determination module detects the environment of the event, based on the geolocation of the event. In one implementation, the location determination module queries a third-party map service, such as Google Maps or Bing Maps, at the latitude and longitude of the event. Environments can include a forest, a body of water, a residential area, an industrial area, and traffic routing (e.g., divided highway, overpass). In one implementation, the location determination module queries a service to determine characteristics of the environment. In one implementation, the location determination module detects the environment of the event using artificial intelligence models (e.g., ConvNets, decision trees, classifiers, etc.) and data from the sensor arrays and/or other sensors.

In S645, the location determination module determines or identifies the event, based on the environment (e.g., characteristics of the environment) and the first and second physical properties. For example, if the environment is a forest, a detection of sound and light can indicate a forest fire. In contrast, a detection of sound and light in a residential area can indicate a fireworks explosion, and a detection of sound and light in an industrial area can indicate an exploding generator. Like S640, the location determination module can perform this operation using artificial intelligence models (e.g., ConvNets, decision trees, classifiers, etc.)

In S650, the location determination module (or the processor executing the location determination module) takes an action, based on the event. For example, if the location determination module determines there is an emergency vehicle in the drive path of an AV, the module can notify the processor to brake the AV. On the other hand, if the location determination module determines there is an emergency vehicle across a divider in the road, then the location determination module can determine that maintaining speed is an appropriate action. If the location determination module determines that a generator has exploded, the location determination module can control a network interface to dial emergency services and report the geolocation of the explosion. The location determination module then advances to S665.

Returning to S620, if the second physical property is not detected with a second sensor array within the predetermined period, the location determination module can optionally deactivate or ignore some of the sensor arrays in S655. For example, enough time might elapse such that any detected sound exceeds a detection horizon of the first physical property. As one example, enough time might have elapsed following a light that any subsequent detected sound is likely from a different source rather than the source that created the light. In that case, the location determination module might disable the audio sensor array but allow a slower array (e.g., wind speed) to continue to operate.

In S660, the location determination module determines whether any sensor arrays remain active. If so, then the location determination module returns to S620. If not, the location determination module continues to S665.

At S665, the workflow concludes.

Use Case

FIG. 7 illustrates the workflow for a use case of event location determination in accordance with one implementation of the present disclosure. The workflow begins at S700 and proceeds to S705.

In S705, the location determination module detects an event by an array of light sensors (e.g., cameras) or audio sensors (e.g., microphones). Although light travels significantly faster than sound, one common occurrence is that emergency vehicles are heard before they are seen. Thus, the workflow of FIG. 7 can accommodate whichever physical property is first detected.

In S710, the location determination module determines the direction of the event relative to the detecting array. For example, in the case of the sensors aligned with 360° coverage (e.g., in the shape of a circle), a first one of the sensors to sense the physical property is closer to the event than the other sensors. Thus, the location determination module determines that the event is nominally in the direction of the first one of the sensors.

In S715, the location determination module records a timestamp of the first detection, the direction of the event relative to the detecting array, and the identity (e.g., light or audio) of the detecting array.

The location determination module can then tune the other array in the direction of the event. One such tuning includes pivoting or otherwise moving the sensors of the other array. In another example of tuning, additional resources temporarily can be allocated to the sensors of the other array to, e.g., increase their resolution. For example, if the other array is an array of cameras, the frame rate of the cameras in the direction of the event temporarily can be increased.

In addition, sensors of the other array not directed in the direction of the event can be deactivated or ignored.

In S720, the location determination module determines whether the other array has detected a physical property of the event within a predetermined period. If so, the location determination module records the timestamp of the second detection and the identity of the second array in S725.

In S730, the location determination module determines the distance to the event based on the first and second timestamps and the velocity of the chassis including the arrays. Although this operation is similar to S730, the physical properties are not necessarily considered, because the physical properties sensed by the arrays are fewer.

In S735, the location determination module determines the geolocation (e.g., latitude and longitude) of the event based on the direction, distance, and array chassis geolocation. This operation largely mirrors S635 and is not further detailed.

In S740, the location determination module determines the environment of the event, based on the geolocation. This operation largely mirrors S640 and is not further detailed.

In S745, the location determination module determines the event, based on the environment and the identities of the first and second arrays. This operation largely mirrors S645 and is not further detailed.

In S750, the location determination module takes action. This operation largely mirrors S650 and is not further detailed. The workflow then advances to S760.

Returning to S720, if the other array does not detect the event, the location determination module determines whether a timer has expired in S755. If not, the location determination module returns to S720. If so, the location determination module advances to S760.

The workflow concludes at S760.

Although the above examples describe a plurality of timestamps, similar effects can be achieved by starting a timer at a default time, such as zero, upon sensing of the first physical property.

Exemplary System

Figure 8:
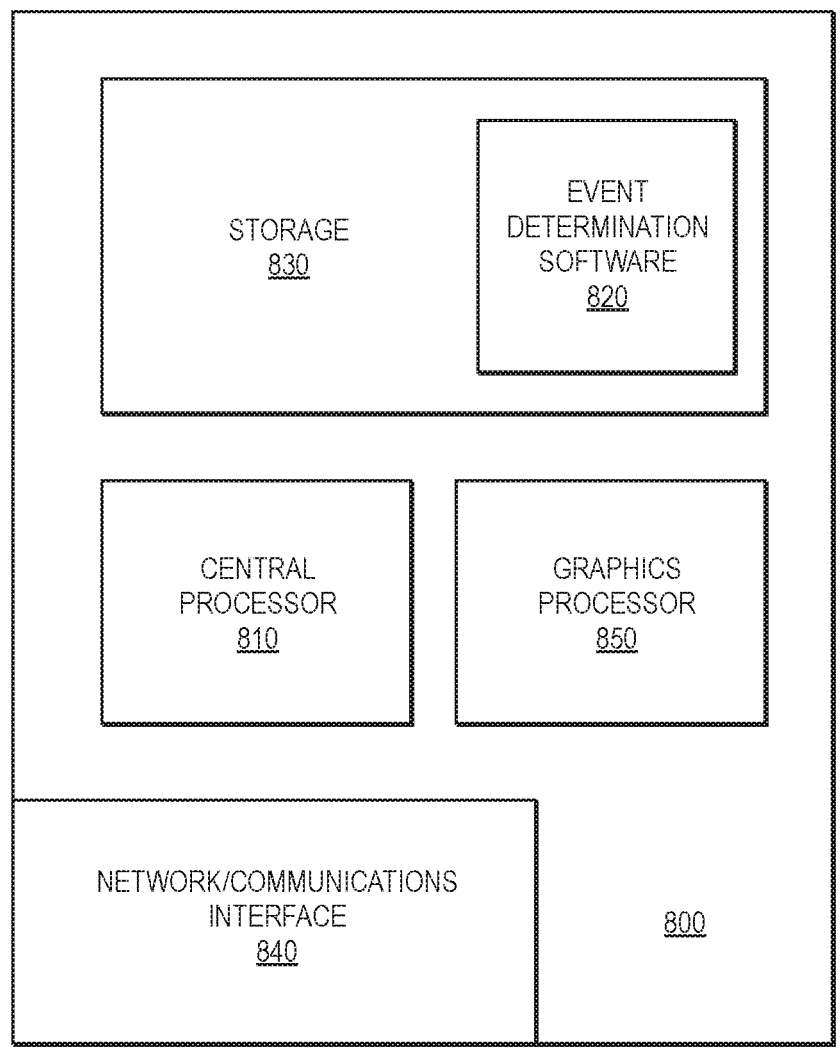
FIG. 8 illustrates components of a computing system used in implementations described herein.

FIG. 8 illustrates components of a computing system used in implementations described herein. Specifically, the components of FIG. 8 can be present in a vehicle, an AV, or a stationary object, such as an antenna.

Referring to FIG. 8, system 800 can be implemented within one computing device or distributed across multiple computing devices or sub-systems that cooperate in executing program instructions. In some implementations, the system 800 can include one or more blade server devices, standalone server devices, personal computers, routers, hubs, switches, bridges, firewall devices, intrusion detection devices, mainframe computers, network-attached storage devices, smartphones and other mobile telephones, and other computing devices. The system hardware can be configured according to any suitable computer architectures such as a Symmetric Multi-Processing (SMP) architecture or a Non-Uniform Memory Access (NUMA) architecture.

The system 800 can include a CPU 810, which can include one or more hardware processors and/or other circuitry that retrieves and executes software 820 from storage 830. CPU 810 can be implemented within one processing device, chip, or package and can also be distributed across multiple processing devices, chips, packages, or sub-systems that cooperate in executing program instructions. In one implementation, system 800 includes a central processing unit (CPU) 810 and a graphics processing unit (GPU) 850. The GPU 850 can execute the visual/image processing in the computing system. The GPU 850, or any second-order processing element independent from CPU 810 dedicated to processing imagery and other perception data in real or near real-time, can provide a significant benefit.

Storage 830 can include any computer-readable storage media readable by CPU 810 and that stores software 820. Storage 830 can be implemented as one storage device and can also be implemented across multiple co-located or distributed storage devices or sub-systems. Storage 830 can include additional elements, such as a controller, that communicate with CPU 810. Storage 830 can also include storage devices and/or sub-systems on which data and/or instructions are stored. System 800 can access one or more storage resources to access information to carry out any of the processes indicated by software 820.

Software 820, including routines for at least partially performing at least one of the processes illustrated in FIGS. 5-7, can be implemented in program instructions. Further, software 820, when executed by system 800 in general or CPU 810 in particular, can direct, among other functions, the system 800 or CPU 810 to operate as described herein.

In implementations where the system 800 includes multiple computing devices, the server can use one or more communications networks that facilitate communication among the computing devices. For example, the one or more communications networks can include or be a local or wide area network that facilitates communication among the computing devices. One or more direct communication links can be included between the computing devices. In addition, the computing devices can be installed at geographically distributed locations or at one geographic location, such as a server farm or an office.

System 800 can include a communications interface 840 that provides one or more communication connections and/or one or more devices that allow for communication between system 800 and other computing systems (not shown) over a communication network or collection of networks (not shown) or the air.

As described herein, one aspect of the present technology is the gathering and use of data available from various sources to improve quality and experience. The present disclosure contemplates that, in some instances, this gathered data may include personal information. The present disclosure contemplates that the entities involved with such personal information respect and value privacy policies and practices.

Aspects of the present disclosure, in particular, aspects of determining an object or event location, described herein, can be embodied in various manners (e.g., as a method, a system, a computer program product, or a computer-readable storage medium). Accordingly, aspects of the present disclosure can take the form of a hardware implementation, a software implementation (including firmware, resident software, or micro-code) or an implementation combining software and hardware aspects that can generally be referred to herein as a "circuit," "module" or "system." Functions described in this disclosure can be implemented as an algorithm executed by one or more hardware processing units, e.g. one or more microprocessors of one or more computers. In various embodiments, different steps and portions of the operations of the methods described herein can be performed by different processing units. Furthermore, aspects of the present disclosure can take the form of a computer program product embodied in one or more computer-readable media having computer-readable program code embodied, e.g., stored or encoded, thereon. In various embodiments, such a computer program can, for example, be downloaded (or updated) to the existing devices and systems or be stored upon manufacturing of these devices and systems.

The following detailed description presents various descriptions of specific certain embodiments. The innovations described herein can be embodied in a multitude of different ways, for example, as defined and covered by the claims and/or select examples. In the following description, reference is made to the drawings where like reference numerals can indicate identical or functionally similar elements. Elements illustrated in the drawings are not necessarily drawn to scale. Additionally, certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. Numerous implementation-specific decisions might be made to achieve the developer's specific goals, including compliance with system, business, and/or legal constraints, which may vary from one implementation to another. Additionally, while such a development effort might be complex and time-consuming; it would be a routine undertaking for those of ordinary skill in the art having the benefit of this disclosure.

In this disclosure, reference might be made to spatial relationships between various components and to the spatial orientation of various aspects of components as depicted in the attached drawings. As will be recognized by those skilled in the art after a complete reading of the present disclosure, the devices, components, members, and apparatuses described herein can be positioned in any orientation. Thus, the use of terms such as "above", "below", "upper", "lower", "top", "bottom", or other similar terms to describe a spatial relationship between various components or to describe the spatial orientation of aspects of such components, describe a relative relationship between the components or a spatial orientation of aspects of such components, respectively, as the components described herein can be oriented in any direction. When used to describe a range of dimensions or other characteristics (e.g., time, pressure, temperature, length, width, etc.) of an element, operations, and/or conditions, the phrase "between X and Y" represents a range that includes X and Y.

As used herein, the terms "storage media," "computer-readable storage media," or "computer-readable storage medium" can refer to non-transitory storage media, such as a hard drive, a memory chip, and cache memory, and to transitory storage media, such as carrier waves or propagating signals.

Particular implementations described herein might not achieve the objects or advantages described herein. Thus, for example, certain implementations can operate in a manner that achieves or optimizes one advantage or group of advantages as taught herein and not others of the objects or advantages.

Any number of electrical circuits of the FIGS. can be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.) and computer-readable, non-transitory memory elements can be coupled to the board based on particular configurations, processing demands, or computer designs. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

The electrical circuits of the FIGS. can be implemented as standalone modules (e.g., a device with associated components and circuitry configured to perform a specific application or function) or implemented as plug-in modules into application specific hardware of electronic devices. Particular implementations of the present disclosure can be included in a system on chip (SOC) package, possibly in part. An SOC represents an integrated circuit (IC) that integrates components of a computer or other electronic system into one chip. It can contain digital, analog, mixed-signal, and often radio frequency functions that can be provided on one chip substrate. Other embodiments can include a multi-chip-module (MCM), with a plurality of separate ICs located within an electronic package and that interact through the electronic package. In various other implementations, the digital filters can be implemented in one or more silicon cores in Application Specific Integrated Circuits (ASICs), Field Programmable Gate Arrays (FPGAs), and other semiconductor chips.

The specifications, dimensions, and relationships outlined herein (e.g., the number of processors, logic operations, etc.) have been offered for purposes of example and teaching. Such information can be varied considerably, as the specifications apply to non-limiting examples. In the foregoing description, example implementations have been described with reference to particular arrangements of components. Various modifications and changes can be made to such implementations. The description and drawings are, accordingly, to be regarded in an illustrative sense and not in a restrictive sense.

With the numerous examples provided herein, interaction may be described in terms of two, three, four, or more electrical components for purposes of clarity and example. The system can be consolidated in any suitable manner. Along similar design alternatives, any of the illustrated components, modules, and elements of the FIGS. can be combined in various possible configurations within the scope of this disclosure. In certain cases, it might be easier to describe one or more of the functionalities of a given set of flows by referencing a limited number of electrical elements. The electrical circuits of the FIGS. and their teachings are readily scalable and can accommodate many components, as well as more complicated/sophisticated arrangements and configurations. Accordingly, the examples provided do not limit the scope or inhibit the teachings of the electrical circuits as potentially applied to a myriad of other architectures.

In this disclosure, references to various features (e.g., elements, structures, modules, components, steps, operations, characteristics, etc.) included in "one implementation", "example implementation", "an implementation", "another implementation", "some implementations", "various implementations", "other implementations", "alternative implementation", and the like are intended to mean that any such features are included in one or more implementations of the present disclosure and might not necessarily be combined in the same embodiments.

The functions related to determining object or even location, e.g. those summarized in the one or more processes shown in FIGS., illustrate some of the possible functions that can be executed by, or within, the systems illustrated in the FIGS. Some of these operations can be deleted or omitted where appropriate, or these operations can be modified or changed considerably. In addition, the timing of these operations can be altered considerably. The preceding operational flows have been offered for purposes of example and discussion. Implementations described herein provide flexibility, in that any suitable arrangements, chronologies, configurations, and timing mechanisms can be provided.

Numerous other changes, substitutions, variations, alterations, and modifications might be ascertained by one skilled in the art, and the present disclosure encompasses such changes, substitutions, variations, alterations, and modifications as falling within the scope of the appended claims.

Optional features of the apparatus described above can be implemented with respect to the method or process described herein and specifics in the examples can be used anywhere in one or more embodiments.

To assist the United States Patent and Trademark Office (USPTO) and, additionally, any readers of any patent issued on this application in interpreting the claims appended hereto, Applicant wishes to note that the Applicant does not intend, by any statement in the specification, to limit this disclosure in any way that is not otherwise reflected in the appended claims.

EXAMPLES

Example 1 is a method including recording a first timestamp of a detection with a first sensor array of a first physical property of an event; determining a direction of the event, based on the detection with the first sensor array; recording a second timestamp of a detection with a second sensor array of a second physical property of the event; determining a distance of the event from the first and second sensor arrays, based on the first timestamp and the second timestamp; determining the event, based on the first physical property and the second physical property; and taking an action based on the event.

In Example 2, the subject matter of Example 1 can optionally include determining a geolocation of the event, based on the distance of the event and the direction of the event.

In Example 3, the subject matter of Example 2 can optionally include the geolocation being determined based on a geolocation of a chassis including the first and second sensor arrays.

In Example 4, the subject matter of any one of Examples 2-3 can optionally include detecting an environment of the event, based on the geolocation of the event, wherein the event is determined based on the environment.

In Example 5, the subject matter of any one of Examples 1-4 can optionally include the distance of the event being determined based on the first physical property and the second physical property of the event.

In Example 6, the subject matter of any one of Examples 1-5 can optionally include the distance of the event being determined based on a velocity of the first and second sensor arrays.

In Example 7, the subject matter of any one of Examples 1-6 can optionally include the action being guiding an autonomous vehicle to a side of a road.

Example 8 is one or more non-transitory, computer-readable media encoded with instructions that, when executed by one or more processing units, perform a method. The method includes recording a first timestamp of a detection with a first sensor array of a first physical property of an event; determining a direction of the event, based on the detection with the first sensor array; recording a second timestamp of a detection with a second sensor array of a second physical property of the event; determining a distance of the event from the first and second sensor arrays, based on the first timestamp and the second timestamp; determining the event, based on the first physical property and the second physical property; and taking an action based on the event.

In Example 9, the subject matter of Example 8 can optionally include determining a geolocation of the event, based on the distance of the event and the direction of the event.

In Example 10, the subject matter of Example 9 can optionally include the geolocation being determined based on a geolocation of a chassis including the first and second sensor arrays.

In Example 11, the subject matter of any one of Examples 9-10 can optionally include detecting an environment of the event, based on the geolocation of the event, wherein the event is determined based on the environment.

In Example 12, the subject matter of any one of Examples 8-11 can optionally include the distance of the event being determined based on the first physical property and the second physical property of the event.

In Example 13, the subject matter of any one of Examples 8-12 can optionally include the distance of the event being determined based on a velocity of the first and second sensor arrays.

In Example 14, the subject matter of any one of Examples 8-13 can optionally include the action being guiding an autonomous vehicle to a side of a road.

Example 15 is a system including a memory that stores instructions; a processing unit that executes the instructions; and a location determination module to record a first timestamp of a detection with a first sensor array of a first physical property of an event; determine a direction of the event, based on the detection with the first sensor array; record a second timestamp of a detection with a second sensor array of a second physical property of the event; determine a distance of the event from the first and second sensor arrays, based on the first timestamp and the second timestamp; determine the event, based on the first physical property and the second physical property; and take an action based on the event.

In Example 16, the subject matter of Example 15 can optionally include the location determination module further being to determine a geolocation of the event, based on the distance of the event and the direction of the event.

In Example 17, the subject matter of Example 16 can optionally include the geolocation being determined based on a geolocation of a chassis including the first and second sensor arrays.

In Example 18, the subject matter of Example 16 can optionally include the location determination module further being to detect an environment of the event, based on the geolocation, and the event is determined based on the environment.

In Example 19, the subject matter of any one of Examples 15-18 can optionally include the first sensor array and the second sensor array, wherein the system is an autonomous vehicle.

In Example 20, the subject matter of any one of Examples 15-19 can optionally include the distance of the event being determined based on a velocity of a chassis including the first and second sensor arrays.

Example 21 is a method including recording a first timestamp of a detection of an event by a first array of an array of light sensors or an array of acoustic sensors, wherein the array of light sensors and the array of acoustic sensors are mounted on a same chassis; determining a direction of the event, based on the detection with the first array; recording a second timestamp of a detection of the event by a second array of the array of light sensors or the array of audio sensors; determining a distance of the event from the arrays of light and audio sensors, based on the first timestamp and the second timestamp; and controlling a vehicle, based on the event, the vehicle including the chassis.

In Example 22, the subject matter of Example 21 can optionally include determining a geolocation of the event, based on the distance of the event and the direction of the event.

In Example 23, the subject matter of Example 22 can optionally include the geolocation of the event being determined based on a geolocation of the chassis.

In Example 24, the subject matter of any one of Examples 22-23 can optionally include detecting an environment of the event, based on the geolocation of the event, wherein the event is determined based on the environment.

In Example 25, the subject matter of any one of Examples 21-24 can optionally include recording an identity of the first array in response to the detection with the first array, wherein the event is determined based on the identity of the first array and the first and second timestamps.

In Example 26, the subject matter of any one of Examples 21-25 can optionally include receiving a speed of the chassis from a speedometer, wherein the distance of the event is determined based on the speed of the chassis.

In Example 27, the subject matter of any one of Examples 21-26 can optionally include tuning the second array, based on the direction of the event.

Example 28 is a non-transitory, computer-readable medium encoded with instructions that, when executed by a processing unit, perform a method. The method includes recording a first timestamp of a detection of an event with a first array of an array of light sensors or an array of acoustic sensors, wherein the array of light sensors and the array of acoustic sensors are mounted on a same chassis; determining a direction of the event, based on the detection with the first array; recording a second timestamp of a detection of the event by a second array of the array of light sensors or the array of audio sensors; determining a distance of the event from the arrays of light and audio sensors, based on the first timestamp and the second timestamp; and controlling a vehicle, based on the event, the vehicle including the chassis.

In Example 29, the subject matter of Example 28 can optionally include determining a geolocation of the event, based on the distance of the event and the direction of the event.

In Example 30, the subject matter of Example 29 can optionally include the geolocation of the event being determined based on a geolocation of the chassis.

In Example 31, the subject matter of any one of Examples 29-30 can optionally include detecting an environment of the event, based on the geolocation of the event, wherein the event is determined based on the environment.

In Example 32, the subject matter of any one of Examples 28-31 can optionally include recording an identity of the first array in response to the detection with the first array, wherein the event is determined based on the identity of the first array and the first and second timestamps.

In Example 33, the subject matter of any one of Examples 28-32 can optionally include receiving a speed of the chassis from a speedometer, wherein the distance of the event is determined based on the speed of the chassis.

In Example 34, the subject matter of any one of Examples 28-33 can optionally include tuning the second array, based on the direction of the event.

Example 35 is a vehicle including a memory that stores instructions; a processing unit that executes the instructions; a chassis including an array of light sensors and an array of acoustic sensors; and a location determination module to record a first timestamp of a detection of an event with a first array of the array of light sensors or the array of acoustic sensors; determine a direction of the event, based on the detection with the first array; record a second timestamp of a detection of the event by a second array of the array of light sensors or the array of audio sensors; determine a distance of the event from the arrays of light and audio sensors, based on the first timestamp and the second timestamp; and control the vehicle, based on the event.

In Example 36, the subject matter of Example 35 can optionally include the location determination module further being to determine a geolocation of the event, based on the distance of the event and the direction of the event.

In Example 37, the subject matter of Example 36 can optionally include the geolocation of the event being determined based on a geolocation of the chassis.

In Example 38, the subject matter of any one of Examples 36-37 can optionally include the location determination module further being to detect an environment of the event, based on the geolocation of the event, wherein the event is determined based on the environment.

In Example 39, the subject matter of any one of Examples 35-38 can optionally include the location determination module further being to record an identity of the first array in response to the detection with the first array, wherein the event is determined based on the identity of the first array and the first and second timestamps.

In Example 40, the subject matter of any one of Examples 35-39 can optionally include the location determination module further being to receive a speed of the chassis from a speedometer, wherein the distance of the event is determined based on the speed of the chassis.

In Example 41, the subject matter of any one of Examples 35-40 can optionally include the location determination module further being to tune the second array, based on the direction of the event.

What is claimed is:

1. A method, comprising:
   recording, by one or more processing units of a vehicle, a first timestamp of a first detection of an event based on signals captured by an array of light sensors, wherein the array of light sensors is mounted on a chassis of the vehicle;
   determining, by the one or more processing units, a direction of the event, based on an identity of a light sensor of the array of light sensors that sensed the event;
   recording, by the one or more processing units, a second timestamp of a second detection of the event based on signals captured by an array of audio sensors, wherein the array of audio sensors is mounted on the chassis of the vehicle;
   determining, by the one or more processing units, a distance of the event from the arrays of light and audio sensors, based on a difference between the first timestamp and the second timestamp, a speed of sound, and a speed of the chassis of the vehicle; and
   controlling the vehicle to take an action based on the event.

2. The method of claim 1, further comprising:
   determining a geolocation of the event, based on the distance of the event and the direction of the event.

3. The method of claim 1, further comprising:
   determining a geolocation of the event based on a geolocation of the chassis, the distance of the event, and the direction of the event.

4. The method of claim 2, further comprising:
detecting an environment of the event, based on the geolocation of the event, wherein the event is determined based on the environment of the event.

5. The method of claim 1, further comprising:
registering a geolocation of the event with an application backend; and
transmitting the signals from the arrays of light and audio sensors to the application backend.

6. The method of claim 1, wherein:
the speed of the chassis is received from a speedometer of the vehicle.

7. The method of claim 1, further comprising:
transmitting a geolocation of the event to an application backend; and
determining, by the application backend, where the geolocation of the event is located on a map and an environment of the event.

8. One or more non-transitory, computer-readable media encoded with instructions that, when executed by one or mores processing units of a vehicle, perform a method comprising:
recording a first timestamp of a first detection of an event based on signals captured by an array of light sensors, wherein the array of light sensors is mounted on a chassis of the vehicle;
determining a direction of the event, based on an identity of a light sensor of the array of light sensors that sensed the event;
recording a second timestamp of a second detection of the event based on signals captured by an array of audio sensors, wherein the array of audio sensors is mounted on the chassis of the vehicle;
determining a distance of the event from the arrays of light and audio sensors, based on a difference between the first timestamp and the second timestamp, a speed of sound, and a speed of the chassis of the vehicle; and
controlling the vehicle to take an action; based on the event.

9. The one or more non-transitory, computer-readable media of claim 8, the method further comprising:
determining a geolocation of the event, based on a geolocation of the vehicle, the distance of the event, and the direction of the event.

10. The one or more non-transitory, computer-readable media of claim 9, the method further comprising:
determining an environment of the event by querying the geolocation of the event in a map.

11. The one or more non-transitory, computer-readable media of claim 9, the method further comprising:
detecting an environment of the event, based on the geolocation of the event; and
determining the event based on the environment of the event.

12. The one or more non-transitory, computer-readable media of claim 8, the method further comprising:
classifying the event using machine learning based on the signals captured by the array of light sensors and/or the signals captured by the array of audio sensors.

13. The one or more non-transitory, computer-readable media of claim 8, wherein:
the speed of the chassis is received from a speedometer of the vehicle.

14. The one or more non-transitory, computer-readable media of claim 10, the method further comprising:
labeling the event based on the environment of the event.

15. A vehicle, comprising:
one or more memories that store instructions;
one or more processing units that execute the instructions;
a chassis including an array of light sensors and an array of acoustic sensors; and
a location determination module encoded in the instructions, to:
record a first timestamp of a first detection of an event based on signals captured by the array of light sensors;
determine a direction of the event, based on an identity of a light sensor of the array of light sensors that sensed the event;
record a second timestamp of a second detection of the event based on signals captured by the array of audio sensors;
determine a distance of the event from the arrays of light and audio sensors, based on a difference between the first timestamp and the second timestamp, a speed of sound, and a speed of the chassis of the vehicle; and
control the vehicle to take an action; based on the event.

16. The vehicle of claim 15, wherein the location determination module further is to determine a geolocation of the event, based on the distance of the event and the direction of the event.

17. The vehicle of claim 15, wherein the location determination module further is to detect an environment of the event using artificial intelligence models and signals captured by the arrays of light sensor and audio sensors.

18. The vehicle of claim 16, wherein the location determination module further is to:
detect an environment of the event, based on the geolocation of the event;
determining the event based on the environment of the event.

19. The vehicle of claim 15, wherein the location determination module further is to:
determine an environment of the event; and
query a service to determine characteristics of an environment of the event.

20. The vehicle of claim 15, wherein the location determination module further is to receive the speed of the chassis from a speedometer of the vehicle, and the vehicle is an autonomous vehicle.

* * * * *